United States Patent [19]

Anders et al.

[11] 4,059,246

[45] Nov. 22, 1977

[54] PNEUMATIC TUBE BANKING SYSTEM

[75] Inventors: Walter G. Anders; Michael A. Cole; James C. Duncan; Paul A. Leipelt, all of Canton, Ohio

[73] Assignee: Diebold, Incorporated, Canton, Ohio

[21] Appl. No.: 721,552

[22] Filed: Sept. 8, 1976

[51] Int. Cl.² .......................................... B65G 51/34
[52] U.S. Cl. ........................................ 243/7; 181/200; 181/224; 181/252; 243/2; 243/19; 243/23; 243/38; 415/119
[58] Field of Search ............................ 243/1–4, 243/7–9, 19–28, 36, 38; 186/1 C; 181/42, 36 B; 415/119

[56] References Cited

U.S. PATENT DOCUMENTS

| | | | |
|---|---|---|---|
| 974,618 | 11/1910 | Waterhouse | 243/25 |
| 1,052,554 | 2/1913 | Ames | 243/25 |
| 1,791,460 | 2/1931 | Bauer | 243/36 |
| 3,125,286 | 3/1964 | Sanders | 415/119 |
| 3,282,531 | 11/1966 | Stewart | 243/19 |
| 3,312,389 | 4/1967 | Matsui | 415/119 |
| 3,790,101 | 2/1974 | Weissmuller | 243/19 |
| 3,841,584 | 10/1974 | Robinson et al. | 243/19 |
| 3,971,531 | 7/1976 | Davis | 243/25 |
| 3,976,264 | 8/1976 | Ekama et al. | 243/19 |

FOREIGN PATENT DOCUMENTS 239,050   4/1960   Australia .............................. 181/42

OTHER PUBLICATIONS

Tel-Air System Five; Lefebure; 3-11-74.

Primary Examiner—Evon C. Blunk
Assistant Examiner—Jeffrey V. Nase
Attorney, Agent, or Firm—Frease & Bishop

[57] ABSTRACT

A pneumatic tube system for conducting banking transactions with a non-captive carrier traveling between a bank teller terminal in a two-tube carrier conveyor connected with a remote customer terminal with visual communication between the teller and the customer. The terminals and tube structure and their components are combined, interrelated and cooperatively arranged with simple and inexpensive construction to provide quiet and reliable operation. Prior complex carrier delivery and dispatch holding and release devices and blower operating timers and controls are eliminated. The operation of a blower located at the customer terminal, which supplies air for pressure or vacuum movement of the carrier in the two-tube system, is controlled by carrier arrival at or dispatch from either terminal. Noise emanating from air currents in the system is reduced by mufflers located at the terminals in the tube system. The carrier moves through one of the mufflers during travel. The terminals are readily accessible for repair of contained devices.

6 Claims, 43 Drawing Figures

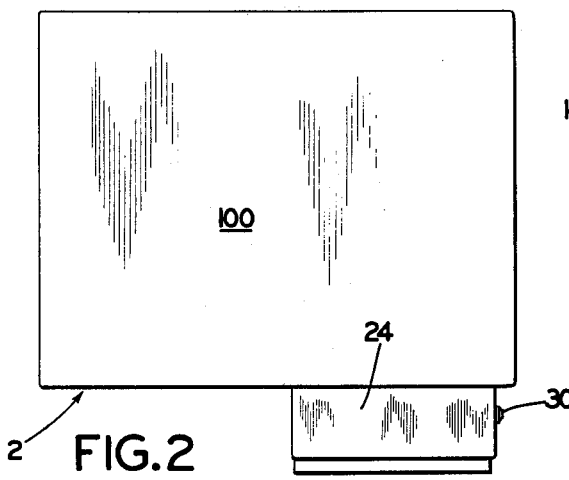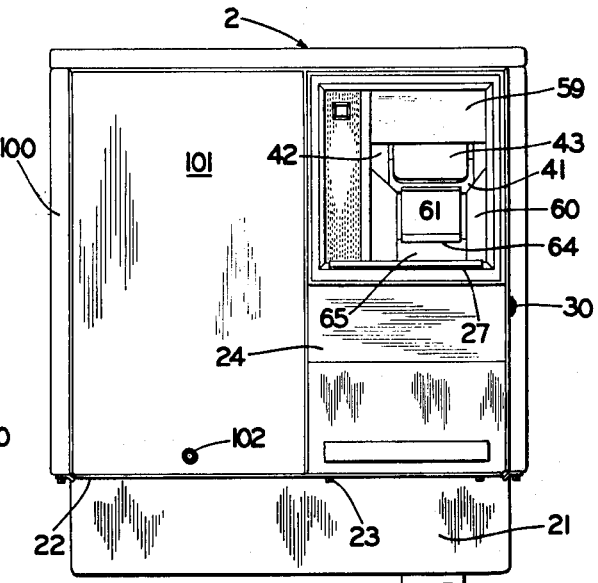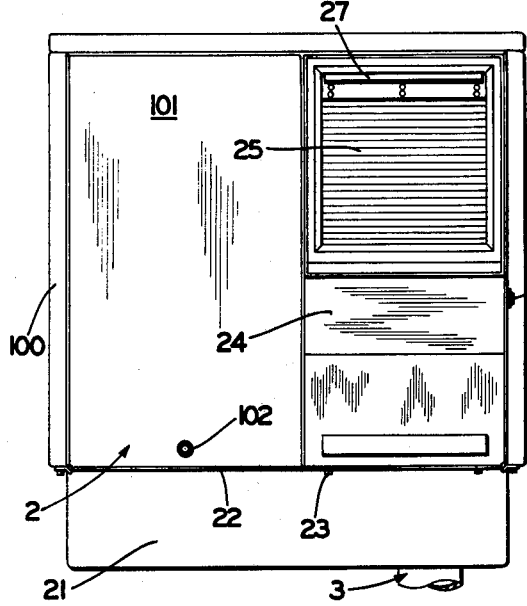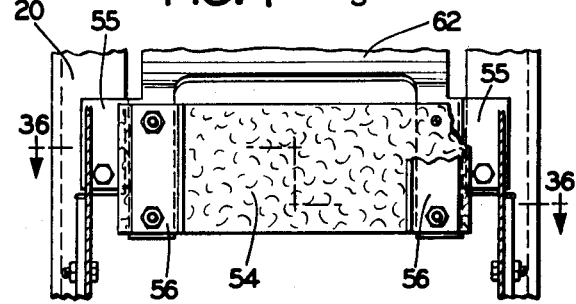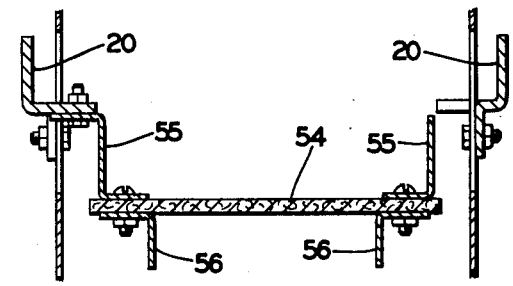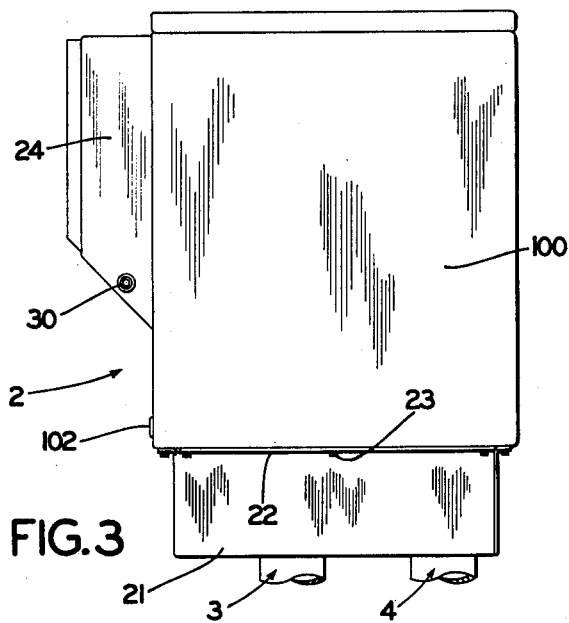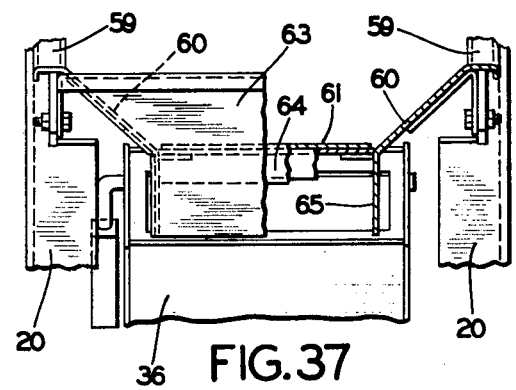

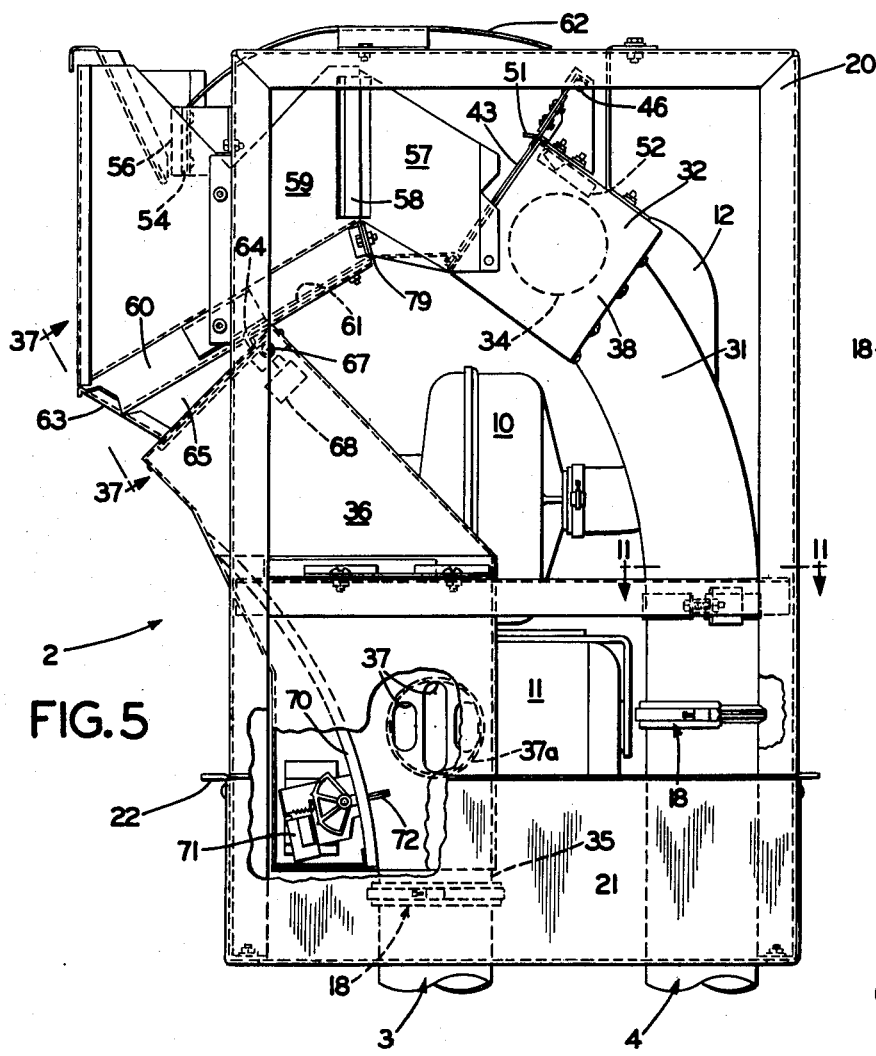
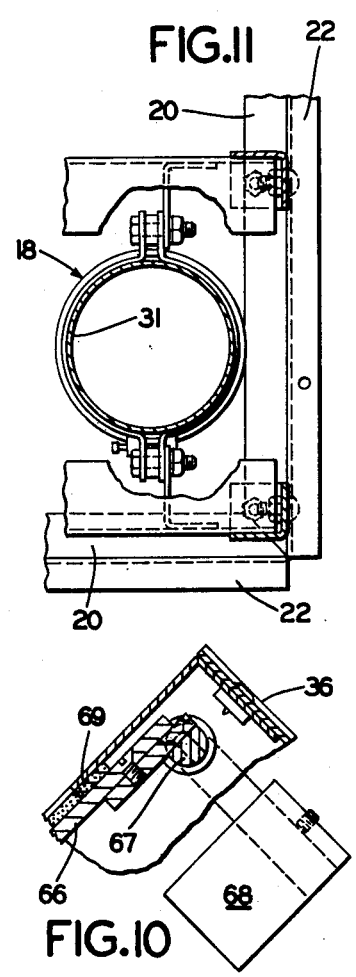
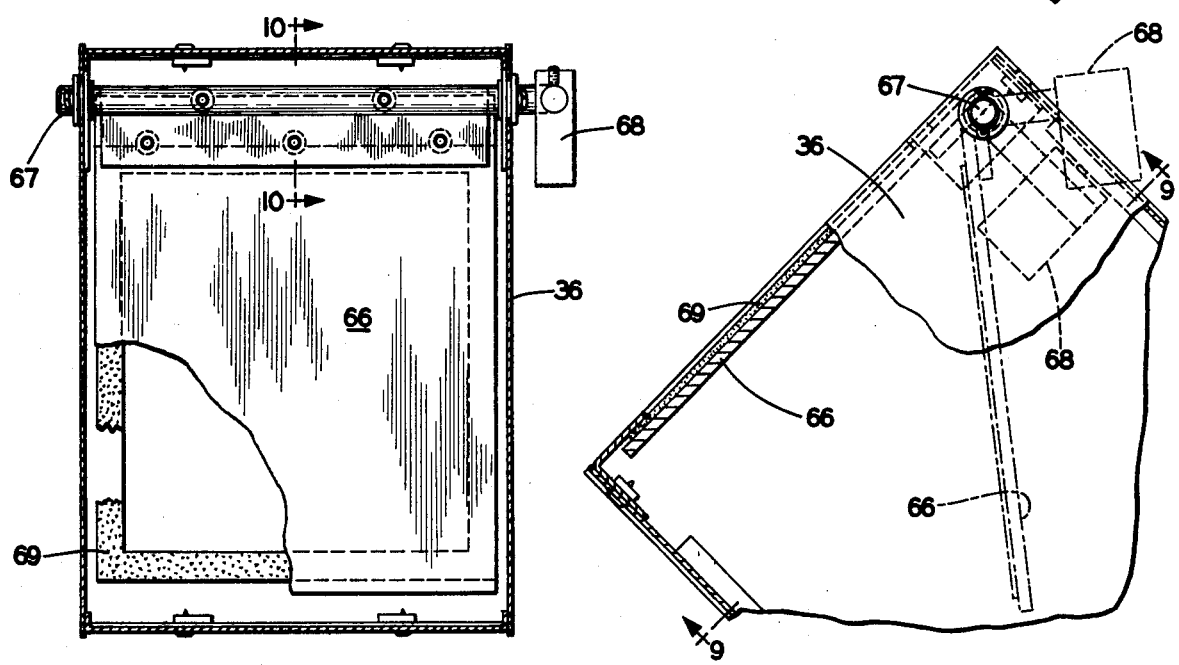
FIG.5  FIG.11  FIG.10  FIG.9  FIG.8

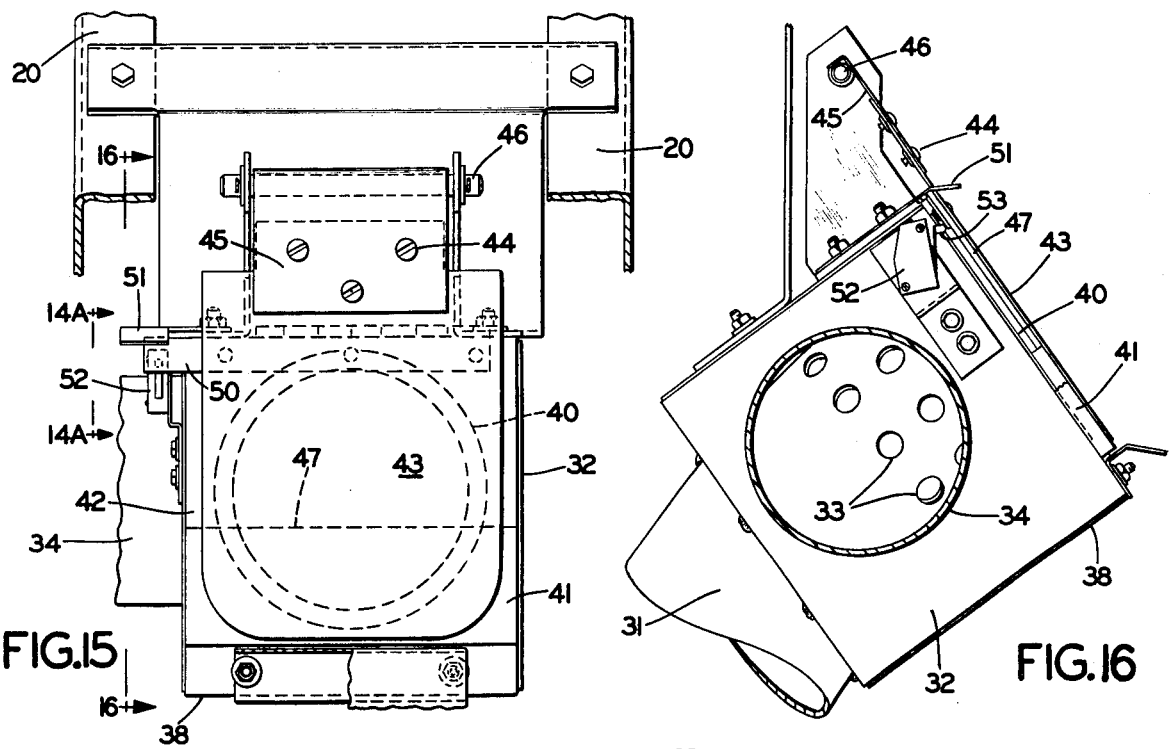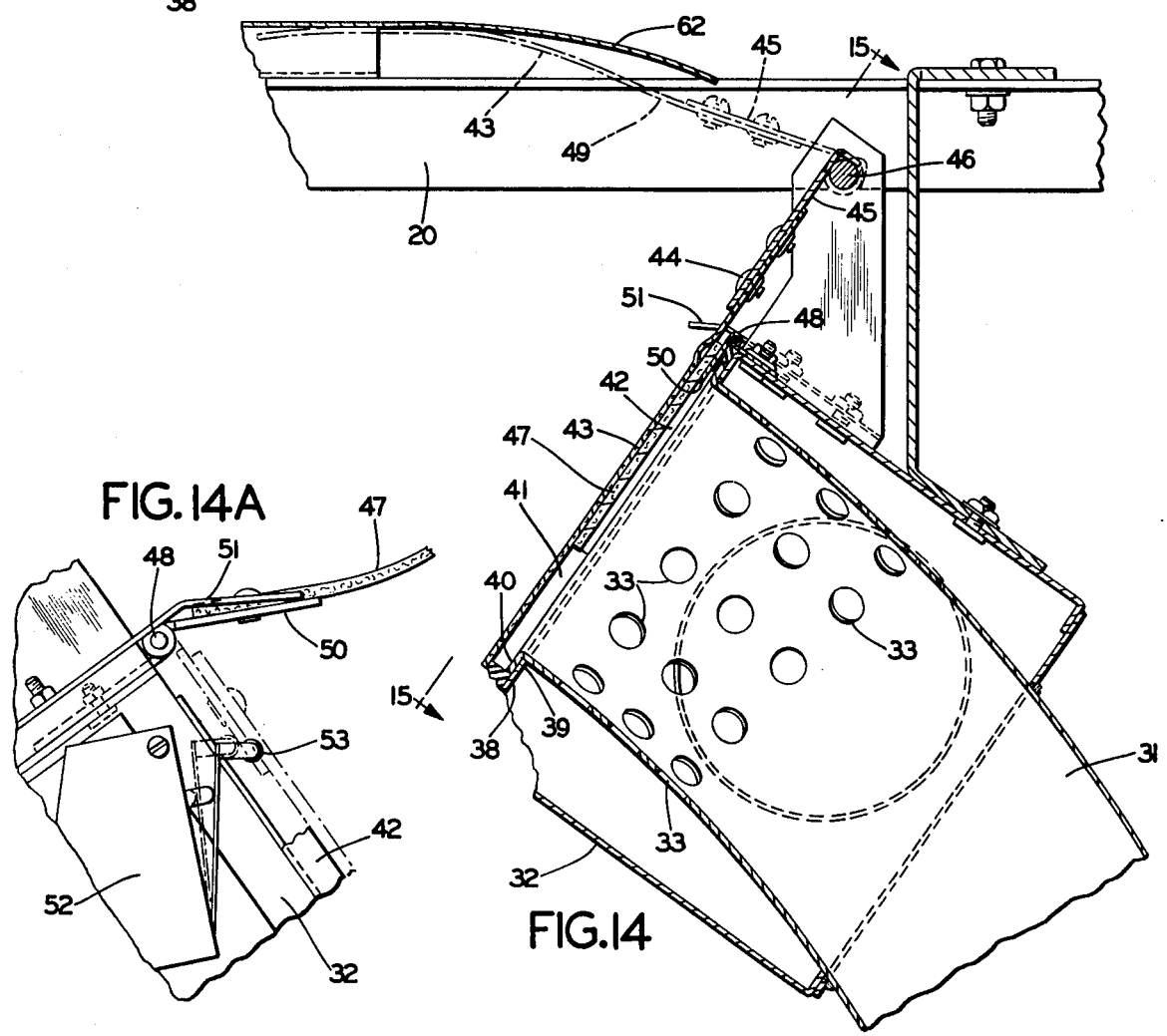

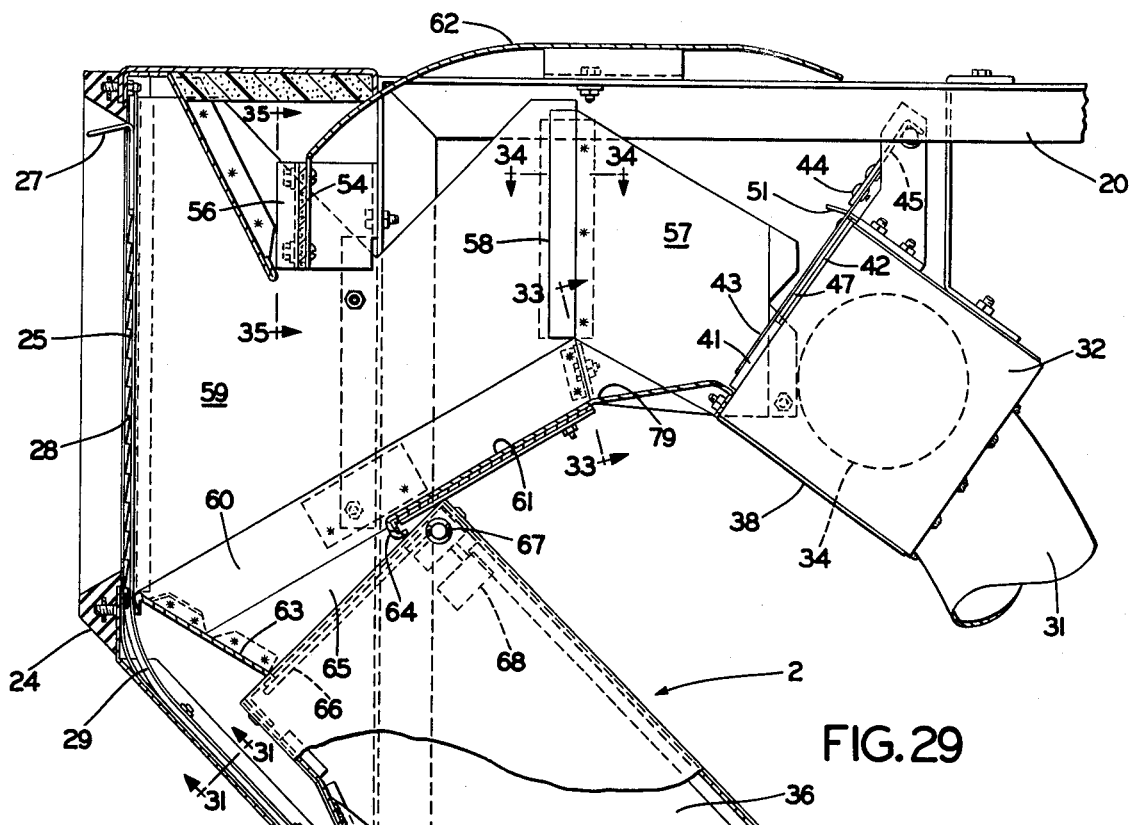
FIG. 29
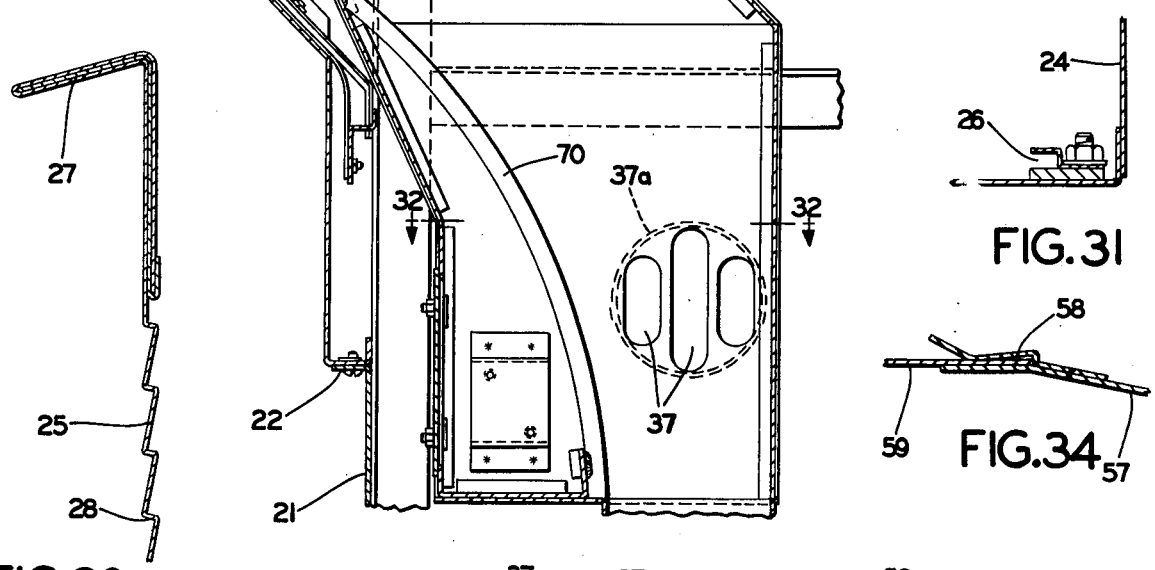
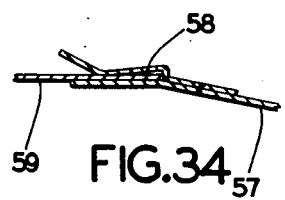
FIG. 31
FIG. 30
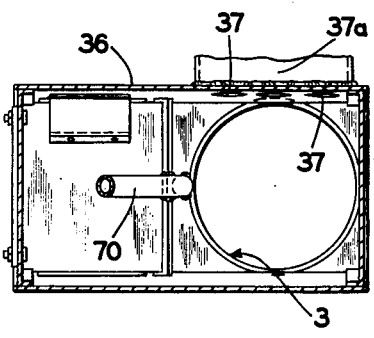
FIG. 32
FIG. 34
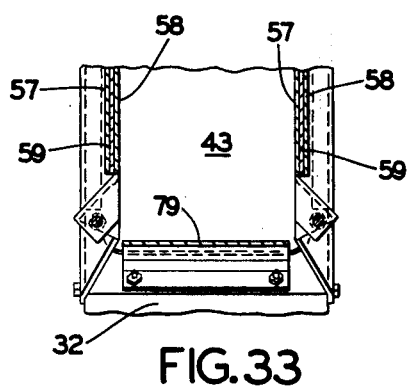
FIG. 33

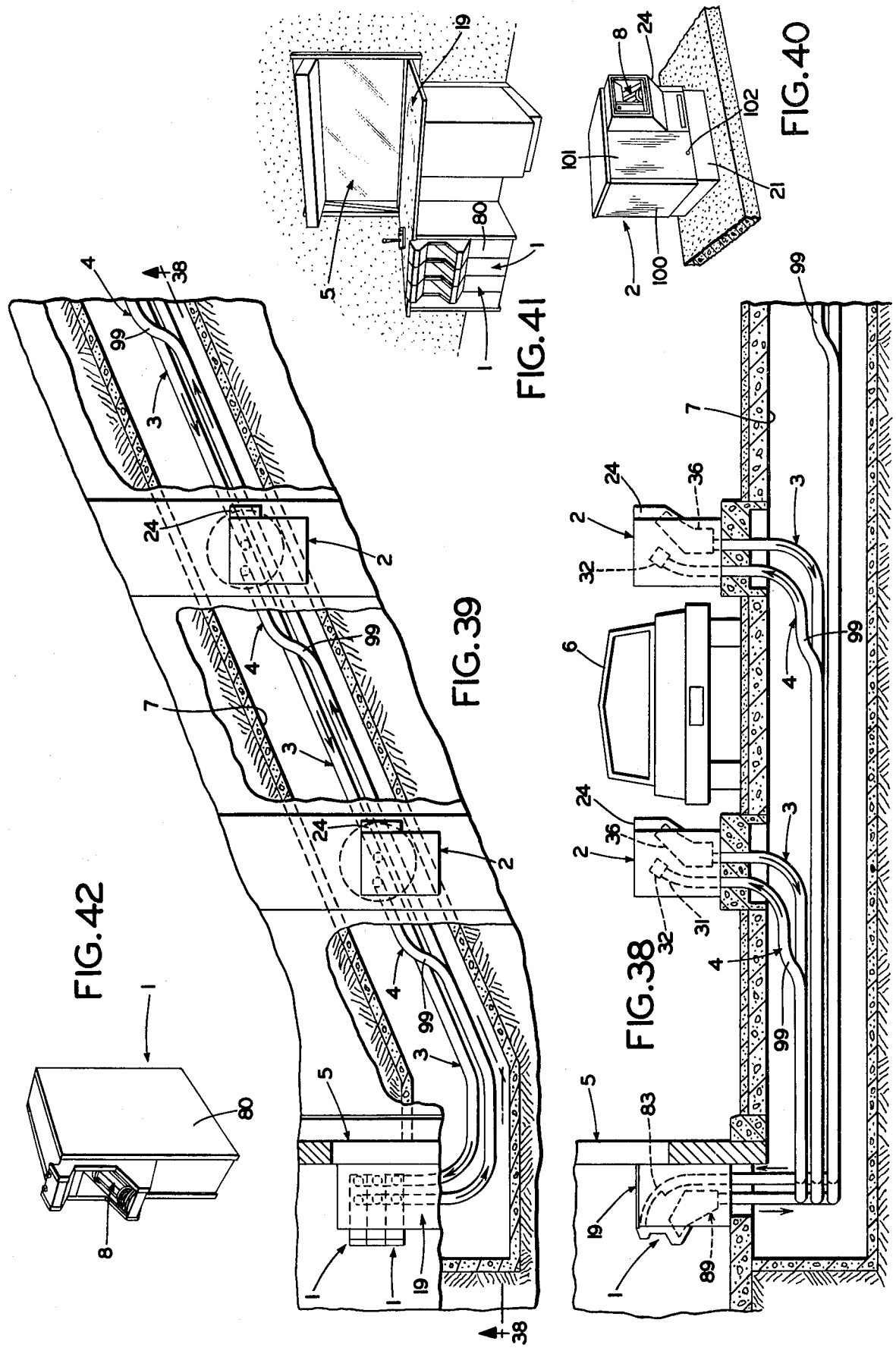

PNEUMATIC TUBE BANKING SYSTEM

BACKGROUND OF THE INVENTION

1. Field of the Invention

The invention relates to a pneumatic tube system in which a carrier is moved rapidly by air pressure or vacuum through conveyor tubes extending between terminals. More particularly, the invention relates to a pneumatic tube system used to carry out banking operations in which a carrier which passes through conveyor tubes is removable from the system at either of the two terminals which may comprise a customer terminal and a teller terminal connected by two conveyor tubes.

2. Description of the Prior Art

Pneumatic tube banking systems in present day use are of two general types, i.e., (1) a captive carrier system and (2) a non-captive or removable carrier system.

Typical captive carrier systems or components are shown, for example, in U.S. Pat. Nos. 3,232,559, 3,237,881, 3,237,882, and 3,237,884. Such captive carrier systems usually involve carrier travel back and forth through a single tube between the customer and teller terminals.

Typical non-captive carrier systems or components are shown, for example, in U.S. Pat. Nos. 3,787,008, 3,788,577, 3,828,698, and 3,867,593. Non-captive carrier systems have used either a single tube extending between the customer and teller terminals through which the carrier travels in either direction; or have used two tubes, a send tube and a receive tube, connected to and extending from the remote customer terminal to the teller terminal.

U.S. Pat. No. 3,867,593 shows a carrier detector used in a single tube non-captive carrier system which may be used to detect and signal direction of carrier movement. Such a system involves changing the direction of air pressure or vacuum in the single tube, depending on the desired direction of a carrier movement. This arrangement also entails sealing the ends of the conveyor tube at each terminal for effective control of the movement of air through the conveyor tube for sending or delivering a carrier from or to a particular terminal at one or the other end of the conveyor tube.

Pneumatic single-tube systems used for banking services, whether of captive or non-captive carrier type, involve many problems relating, among others, to complex arrangement of components to provide delivery and dispatch means of a carrier at either the customer or teller terminal, special holding and release devices at the arrival and send chambers or compartments at each terminal, special blower controls and air direction reversal, timers, etc.

Non-captive carrier systems also have been used involving two conveyor tubes extending between the terminals, one for sending and one for receiving a carrier from or at a terminal. Many of the problems associated with single tube non-captive carrier systems also characterize prior two-tube non-captive carrier systems. In addition, normally the arrangement of two-tube systems involves other difficulties in conveniently locating at each terminal the carrier arriving or being dispatched, assuming that the tubes as normally installed follow a side by side or up and down relative location as connected between the two terminals of the system.

Furthermore, prior non-captive carrier systems have terminals which include spring-controlled doors that have increasing resistance while being opened, either to insert a carrier or by carrier movement on arrival, which may require additional manual effort or may increase wear on or damage to a carrier from repeated carrier-door collision. Also, where timers are used for blower operation, the time interval must be sufficient to permit heavily loaded carriers to traverse the distance between terminals. This, of course, increases the blower on-time for movement of an unloaded carrier between terminals beyond that required, which results in decreased efficiency of power use.

Also, prior terminal structures have combined the terminal cabinet or enclosure members and the framework on which components are mounted within the cabinet. Difficulties result in servicing, repairing, adjusting, or replacing components of any terminal because of relative inaccessibility of components within such cabinet.

These described deficiencies of or objectionable features in prior pneumatic tube systems have resulted in systems very expensive to install or operate or use, systems which are noisy in operation, systems that are unreliable in operation, and systems that have complex arrangement and structure of components. These problems, as stated, for the most part exist with respect to two-tube non-captive systems as well as the other types of pneumatic tube banking systems described.

Thus, there exists a need in pneumatic tube banking systems for simple, reliable, inexpensive, quietly operating non-captive carrier system structures and arrangements of customer and teller terminals and connected two-tube conveyor tube components, in which the terminal structures and multiple tube connections between such terminals have improved and simplified structures combined and coordinated with a simplified blower and blower control system.

SUMMARY OF THE INVENTION

Objectives of the invention include providing a new construction, coordination and arrangement of components of a two-tube non-captive carrier pneumatic tube banking system involving improved customer and teller terminal structures, combined and coordinated with simplified blower and blower control devices, to form a system which is simple, reliable, inexpensive and quietly operating; providing such a two-tube, non-captive carrier system which avoids complex arrangements of terminal components for delivery or dispatch of a carrier from either terminal of the system, which complex structures characterize prior systems; providing a new construction of the customer terminal for a two-tube, non-captive carrier system which avoids prior difficulties involving the cabinet for the terminal components, and permits assembly of the terminal components with the cabinet absent, thereby permitting accessibility of the components for installation, adjustment or repair, and utilizing a simple unitized panel cabinet structure which is telescoped over or removed from the working components of the terminal, and which separate cabinet forms a rigid weather resistant enclosure having exterior surfaces that can be designed to satisfy desired architectural specifications; providing such a new two-tube non-captive system having a blower mounted in the customer terminal equipped with improved mufflers and having improved muffler means through which the carrier passes in the teller terminal so that said mufflers reduce objectionable noise during system operation; providing a new blower and blower control for such two-tube, non-captive system wherein the dispatch of a carrier from either a customer or a teller terminal activates the blower which is deactivated upon arrival of the carrier at the other terminal; providing such a new two-tube non-captive carrier system having unique valve means and carrier arrester means at the customer terminal arrival station, and unique valve means at the customer terminal send station coordinated in the control system for the blower located in the customer terminal; and providing a construction and arrangement of two-tube non-captive carrier pneumatic tube banking system components and assembly which is inexpensive as compared with prior devices, simple in construction, reliable and quiet in operation, readily installed and serviced, and which satisfies the indicated objectives.

These and other objectives and advantages may be obtained by the pneumatic tube banking system which, in general terms may be stated as including in a two-tube, non-captive carrier pneumatic tube banking system, a teller terminal and a remote customer terminal; first and second tubes forming a two-tube carrier conveyor system connecting the terminals; blower means having inlet and outlet means mounted in the customer terminal supplying air to the two-tube system for pressure or vacuum movement of the carrier in tubes of the two-tube system; means connecting the first tube with the blower inlet means; the first tube acting as a carrier-receive tube for the customer terminal; means connecting the second tube with the blower outlet means; the second tube acting as a send tube for the customer terminal; the blower thereby supplying air under vacuum at the customer terminal to the first tube and air under pressure at the customer terminal to the second tube; muffler means mounted in line each with the means connecting the first and second tubes with the blower inlet and outlet means respectively to reduce noise emanating from air currents passing through the system; the first and second tubes having ends at the customer terminal; first blower control means for stopping blower means operation mounted adjacent the first tube customer terminal end; second blower control means for starting blower means operation mounted adjacent the second tube customer terminal end; said first blower control means being actuated by a carrier discharged from said first tube customer terminal end to stop blower means operation; said second blower control means being actuated by a carrier delivered to the second tube customer terminal end to start blower means operation; the first and second tubes having ends at the teller terminal; an arrival station receive tube formed with a discharge opening mounted in the teller terminal; muffler means mounted in the teller terminal connecting the receive tube with the second tube teller station end; dispatch station means mounted in the teller terminal; means connecting the dispatch station means with the first tube teller terminal end; third blower control means operation mounted in the arrival station receive tube between the teller terminal muffler means and the arrival tube discharge opening; fourth blower control means for starting blower means operation mounted in the dispatch station means adjacent the first tube teller terminal end; said third blower control means being actuated by a carrier discharged from the arrival station receive tube to stop blower means operation; and said fourth blower control means being actuated by a carrier delivered to the dispatch station means to start blower means operation.

BRIEF DESCRIPTION OF THE DRAWINGS

A preferred embodiment of the invention - illustrative of the best mode in which applicants have contemplated applying the principles - is set forth in the following description and shown in the drawings, and is particularly and distinctly pointed out and set forth in the appended claims.

FIG. 1 is a front elevation of an improved customer terminal for the new system;

FIG. 2 is a top plan view of the terminal shown in FIG. 1;

FIG. 3 is a side elevation of the terminal shown in FIG. 1;

FIG. 4 is a view similar to FIG. 1, with the sliding cover in open position for access to the carrier arrival and send stations in the customer terminal;

FIG. 5 is an enlarged side elevation of the customer terminal shown in FIG. 1 to 4 with parts broken away and in section and with the terminal cabinet or housing removed;

FIG. 8 is an enlarged fragmentary view, with parts broken away and in section, of the send station shown in FIG. 3, illustrating the tube access opening therein closed by valve means;

FIG. 9 is a sectional view looking in the direction of the arrows 9—9, FIG. 8;

FIG. 10 is a fragmentary sectional view looking in the direction of the arrows 10—10, FIG. 9;

FIG. 11 is a fragmentary sectional view taken on the line 11—11, FIG. 5;

FIG. 14 is an enlarged fragmentary sectional view taken on the line 14—14, FIG. 6 showing the valve controlled arrival station of the customer terminal with the main flexible flap valve shown "closed" in full lines and "open" in dot-dash lines;

FIG. 14A is a view looking in the direction of the arrows 14A—14A, FIG. 15, showing the secondary flexible flap valve in full lines in "open" position and closed in dotted lines;

FIG. 15 is a fragmentary view looking in the direction of the arrows 15—15, FIG. 14;

FIG. 16 is a view, looking in the direction of the arrows 16—16, FIG. 15, of the arrival station showing the other side of components shown in FIG. 14;

FIG. 29 is an enlarged sectional view taken on the line 29—29, FIG. 7, similar to FIG. 5, illustrating the construction of the customer terminal arrival station carrier arrester, and the door construction for the customer station;

FIG. 30 is an enlarged fragmentary sectional view, with parts broken away, of the flexible customer terminal door shown in FIG. 29;

FIG. 31 is a fragmentary sectional view taken on the line 31—31, FIG. 29;

FIG. 32 is a sectional view taken on the line 32—32, FIG. 29;

FIG. 33 is a sectional view taken on the line 33—33, FIG. 29, showing the guide chute extending from the carrier arrival station to the carrier retainer in the customer terminal;

FIG. 34 is a fragmentary sectional view looking in the direction of the arrows 34—34, FIG. 29;

FIG. 35 is a sectional view, illustrating the sling-type carrier arrester at the carrier arrival station of the customer terminal, looking in the direction of the arrows 35—35, FIG. 29;

FIG. 36 is a section taken on the line 36—36, FIG. 35;

FIG. 37 is a view with parts broken away and in section looking in the direction of the arrows 37—37, FIG. 5;

FIG. 38 is a diagrammatic sectional view illustrating the arrangement of an installation of a plurality of customer terminals adjacent a bank structure having a corresponding number of teller stations grouped together and adapted to be attended by one teller;

FIG. 39 is a top plan view of the parts shown in FIG. 38;

FIG. 40 is a perspective view of one of the customer terminals shown in FIGS. 38 and 39;

FIG. 41 is a fragmentary perspective view of a teller station having three teller terminals, such as shown in FIGS. 38 and 39; and FIG. 42 is a perspective view of one of the teller terminals shown in FIG. 41, illustrating a retained carrier that has arrived at the teller terminal.

Similar numerals refer to similar parts throughout the various figures of the drawings.

DESCRIPTION OF THE PREFERRED EMBODIMENT

Figure 6:
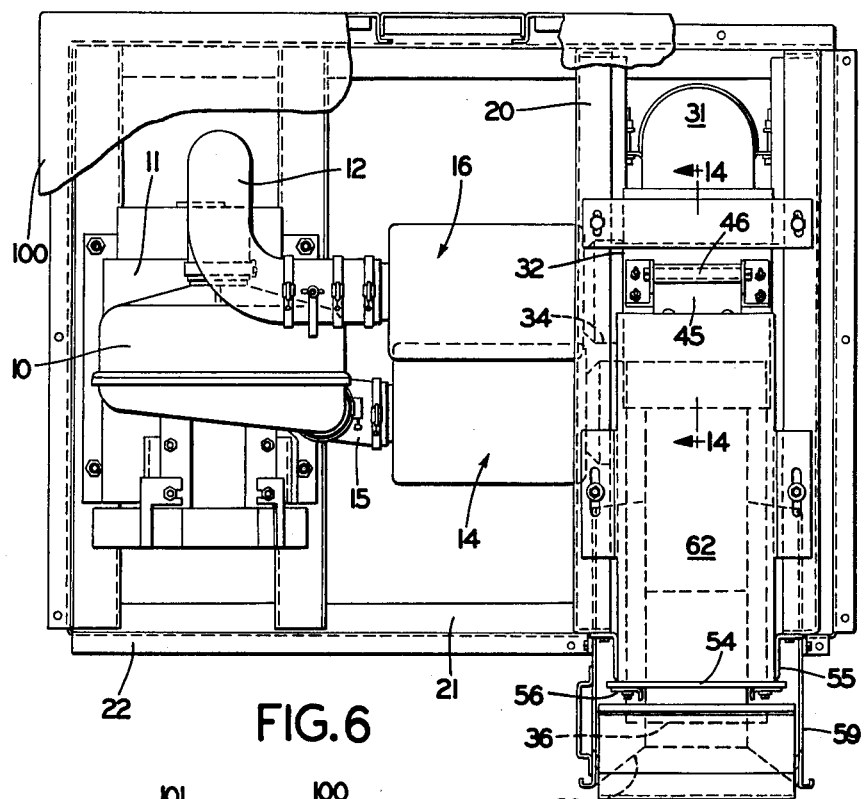
FIG. 6 is a top plan view of the parts shown in FIG. 5.

The pneumatic tube banking system incorporating the concepts of the invention is designed to permit communication and physical banking transactions between a customer at a remote station and a bank teller located inside a bank building, preferably with visual communication between the teller and customer and verbal communication by a usual and known audio system.

The remote customer station preferably is located where a customer in an automobile may drive to the station where he may see the bank teller through a window in the bank building and where a bank teller in the bank building may see a customer in the auto at the customer station. Several customer stations may be served by one teller with visual communication between the teller and customers at all of the several customer stations.

Any one system includes a teller terminal, generally indicated at 1 (FIGS. 38, 39, 41 and 42) and a customer terminal, generally indicated at 2 (FIGS. 1, 2, 3, 4, 38, 39 and 40). The teller and customer terminals 1 and 2 for each system are connected by a pair of pneumatic tubes, generally indicated at 3 and 4.

Various installations including the new concepts are shown, in each of which there is at least a pair of terminals 1 and 2 with a two-tube connection 3-4. FIG. 42 shows a teller terminal for one system. FIG. 41 shows a teller terminal for three systems serviced by a single teller who may view any customer at any of the three customer terminals through the teller bulletproof glass window, generally indicated at 5. FIG. 40 illustrates a customer terminal 2 for one system. Two such customer terminals 2 are shown in FIGS. 38 and 39 which also shows a two-tube connection 3-4 extending to a third customer terminal, not shown. The teller station shown in FIGS. 38 and 39 has three teller terminals 1. A customer's auto shown at 6 for a customer being served at the left-hand customer terminal 2, is illustrated in FIG. 38.

Electric cables, not shown, may extend between the teller station terminals 1 and the several customer stations 2, for connecting the various switches, blowers, etc. in a control system. These electrical cables and the multiple sets or pairs of pneumatic tubes 3 and 4 preferably extend underground between the teller station and various customer stations through a tunnel, culvert or the like, indicated at 7.

Any banking transaction is carried out through the use of a carrier, generally indicated at 8 in FIGS. 25 through 28. The carrier 8 may transfer money, checks, papers, etc. between the two terminals 1 and 2.

In normal operation, a customer removes a carrier 8 from the customer terminal 2, places a deposit within the carrier and drops it into the customer terminal send tube 3. Then air pressure forces the carrier 8 through the tube 3 to the teller terminal 1, as described in detail below. The teller processes the transaction and then drops the carrier 8 into the teller terminal end of the tube 4 which is the send tube from the teller terminal 1. Vacuum pulls the carrier back to the customer terminal 2 where it is deposited at an arrival or receive station. Then it may be removed by the customer to obtain its contents and returned to the receive station by the customer.

Figure 7:
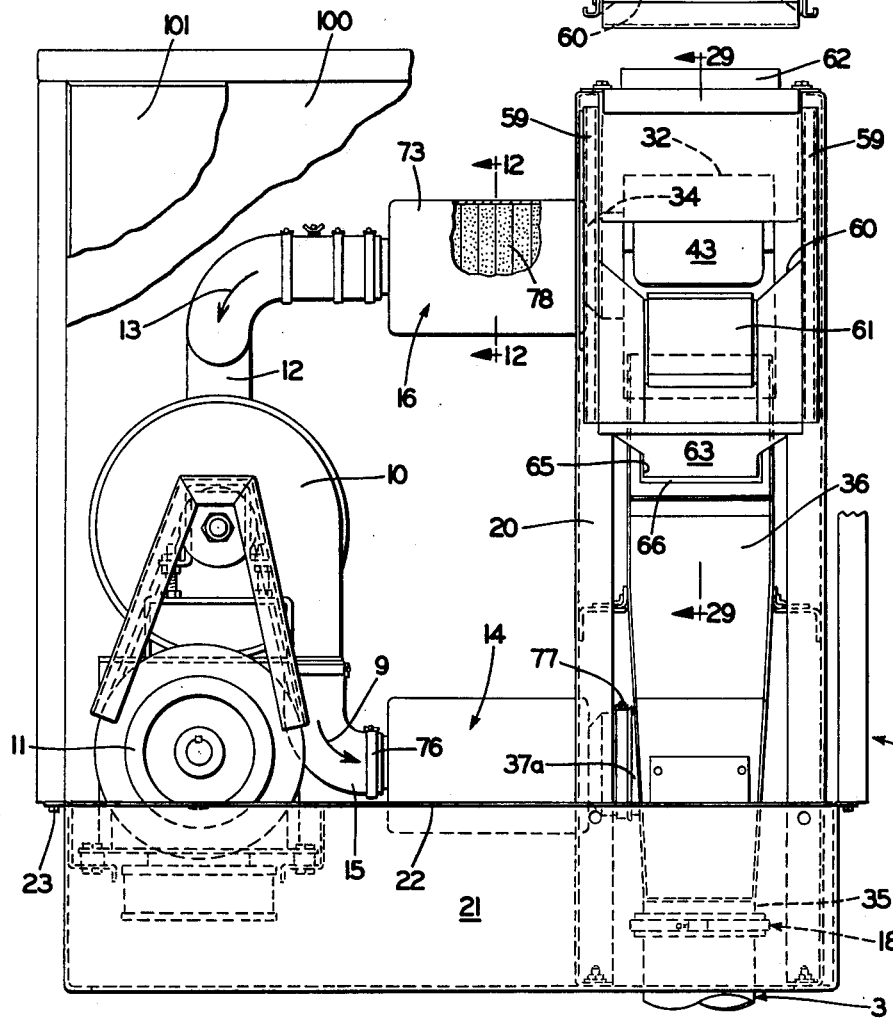
FIG. 7 is a front elevation with parts broken away and in section of the parts shown in FIGS. 5 and 6.

Air pressure, illustrated by the arrow 9 in FIG. 7, is supplied to the customer terminal send tube 3 by a blower 10 driven by a motor 11 installed within the customer terminal 2. The blower intake 12 is connected with the customer terminal receive tube 4 to supply vacuum to that tube as indicated by the arrow 13 in FIG. 7.

An improved muffler 14 is connected between the blower outlet 15 and the customer terminal send tube 3 (FIG. 7); and a similar muffler 16 is connected between the blower intake 12 and the customer terminal receive tube 4, for purposes described below.

Figure 24:
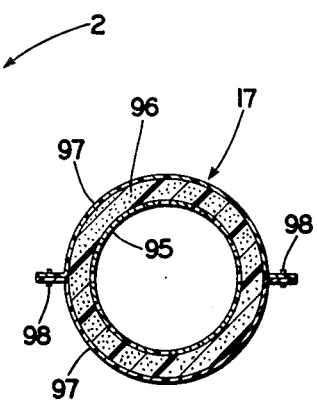
FIG. 24 is a sectional view through the teller terminal muffler taken on the line 24—24, FIG. 17.
Figure 17:
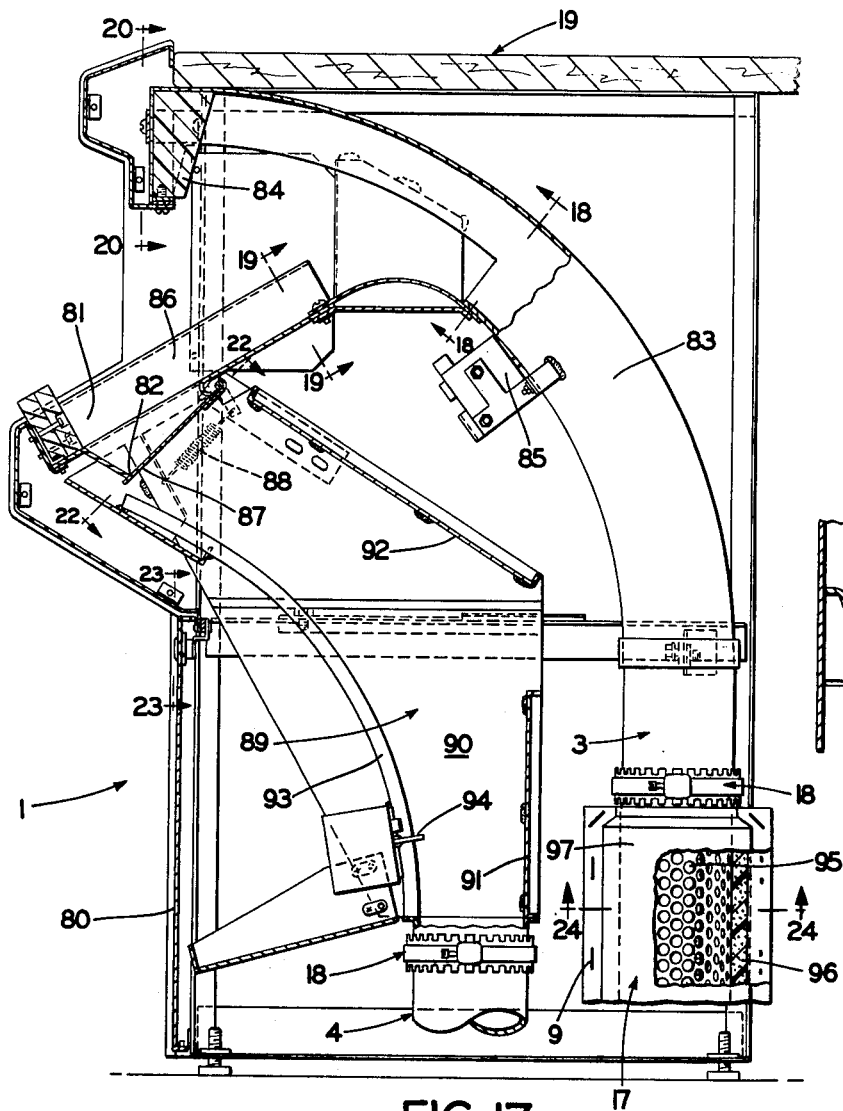
FIG. 17 is a sectional view of a teller terminal, similar to FIG. 5, illustrating the varied construction of a teller terminal.
Figure 18:
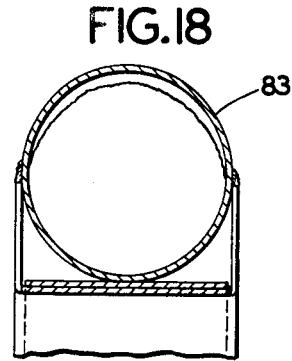
FIG. 18 is a fragmentary sectional view taken on the line 18—18, FIG. 17.
Figure 19:
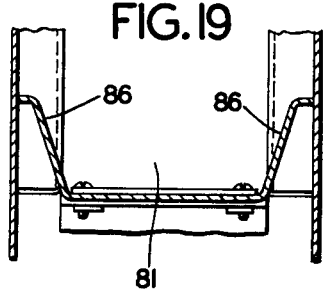
FIG. 19 is a fragmentary sectional view taken on the line 19—19, FIG. 17.
Figure 21:
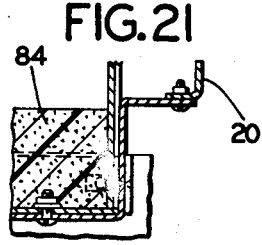
FIG. 21 is a fragmentary sectional view taken on the line 21—21, FIG. 20.

Another muffler, generally indicated at 17 in FIGS. 17 and 24, of modified construction, and through which a carrier 8 passes, is located in a portion of the pneumatic tube 3 located at the teller terminal 1 near the end of the teller terminal receive tube 3 which is one and the same tube as customer terminal send tube 3.

Tube connections between various sections of the pneumatic tubes 3 and 4 may be made using pneumatic tube couplings, generally indicated at 18 (FIGS. 5 and 17), of a type shown in Duncan Pneumatic Tube Coupling Pat. No. 3,822,075.

As stated, any installation of the improved pneumatic tube banking system consists of one or more customer terminals 2, one or more teller terminals 1, a pair of pneumatic tubes 3-4 connecting each pair of customer and teller terminals 1 and 2, a removable carrier 8 which travels in the tube system between any pair of customer and teller terminals 2 and 1, an audio system and control for connecting microphone speaker units for each pair of customer and teller terminals 2 and 1 and a countertop work space for a teller, generally indicated at 19 in FIG. 41 adjacent the terminal or terminals 1. Any audio system is of known construction unnecessary to be described further.

The construction and coordinated arrangement of the various components of the improved pneumatic tube banking system incorporating the new concepts of the invention is described in detail below under appropriate headings.

I. Customer Station

A customer terminal 2 is located at each customer station of any pneumatic tube banking system installation. The terminal 2 generally has a removable outer cabinet or housing described below and an inner open frame structure generally indicated at 20 provided with a base 21. Certain components of terminal 2 are mounted in the inner frame 20 or on the base 21 (FIGS. 5, 6 and 7). Frame 20 has outturned flange members 22 at the top of the base 21 on which the outer cabinet rests and to which it may be bolted at 23 (FIG. 3).

The facia member 24 is mounted on one side of the front of the inner frame 20 and secured to flange means 22 (FIG. 1, 4 and 29); and the facia covers components mounted within the customer terminal 2.

A sliding door 25 is mounted in the facia 24 (FIGS. 29 and 30), being shown closed in FIGS. 1 and 29 and open in FIG. 4. When open, the door slides within the track 26 of the facia 24 (FIGS. 29 and 31) located in the lower portion of the facia. Door 25, as illustrated in FIG. 30, may include a manipulating handle 27 extending horizontally at the upper edge of the door. A light gauge metal portion extends below the handle 27 with shoulder-like formations 28 formed therein and extending horizontally to impart stiffness to the door 25 combined with resilience so that it may be moved around the curved or arcuate track portion 29. Any usual lock 30 may be provided to lock the door in closed position of FIG. 1.

End sections of the pneumatic tubes 3 and 4 extend vertically upward through the base 21 of terminal 2. A final section 31 of the customer terminal end of tube 4 curves upward toward the front of the terminal (to the left in FIG. 5) and terminates in a valve housing 32 which has a rectangular box-like shape.

Perforations 33 are formed in tube section 31 to communicate with the interior of the valve housing 32 (FIG. 14 and 16). A tubular connector member 34 extends from one side of the valve housing 32 (FIGS. 15 and 16) and is connected to the muffler 16 and thence through the muffler to the blower intake member 12 (FIGS. 6 and 7).

A final section 35 of tube 3 (FIG. 5) is connected with the lower end of a customer terminal dispatch hopper 36. The chamber within the dispatch hopper communicates through openings 37 and a tubular connection 37a with an end of muffler 14 (FIGS. 5, 6 and 7) and thence through blower outlet 15 to the blower 10. The dispatch hopper 36 and related equipment form part of the customer terminal dispatch station means.

The customer terminal valve housing 32 (FIGS. 14 and 16) encloses the open perforated end of the final section 31 of tube 4. The housing wall 38 has an opening 39 through which the end of tube section 31 extends. The tube end is flanged outwardly at 40 and joined to the housing wall 38. Saddle-shaped gaskets 41 and 42 overlie the housing wall 38 around the tube end flange 40, and the gaskets 41 and 42 have different thicknesses, gasket 41 being thicker for a purpose to be described.

A main flexible flap valve member 43 is connected at 44 with a hinge strap 45 which is pivoted at 46 on the inner frame. The flap valve 43 is formed of very flexible sheet material which may be plastic or rubber or rubberized fabric or leather to seal the open end of tube section 31 against gasket 41 when the interior of valve housing 32 is under vacuum conditions from the suction end of the blower 10.

A secondary flap valve 47 engaging the underside of main flap valve 43 when both are closed, and preferably somewhat thicker than but formed of the same type of material as valve 43, is pivoted at 48 to the valve housing 32 (FIGS. 14 and 14A). Valve 47 seats against the thinner gasket 42 to complete the seal between the open end of tube section 31 and valve housing 32. The main flap valve 43 where not engaging gasket 41 engages and seals against the two laminations of secondary valve 47 and thinner gasket 42 beneath valve 47.

Main flap valve 43 when opened by impact of a carrier 8 discharged from pneumatic tube 4, can move to the dot-dash "open" position 49 shown in FIG. 14. However, secondary flap valve 47 can only move through an arc of approximately 45° to an "open" position shown in FIG. 14A in full lines. This secondary flap valve opening movement control is accomplished by engagement of an end of the hinge strap 50 of flap valve 47, which extends to one side (FIG. 15) of the flap valve 47, with stop member 51 during opening of secondary flap 47.

A blower control switch 52 is mounted on the outside of the valve housing 32 adjacent the hinge pivot 48 for secondary flap valve 47 and the extended end of hinge strap 50, and below the stop member 51. When flap valve 47 is in closed position, shown in full lines in FIGS. 14, 15 and 16 and in dotted lines in FIG. 14A, switch actuator 53 is in one position held by hinge strap 50. However, when secondary flap valve 47 is opened, hinge strap 50 releases switch actuator 53 to that actuator 53 moves to the other switch position shown in full lines in FIG. 14A.

Figure 25:
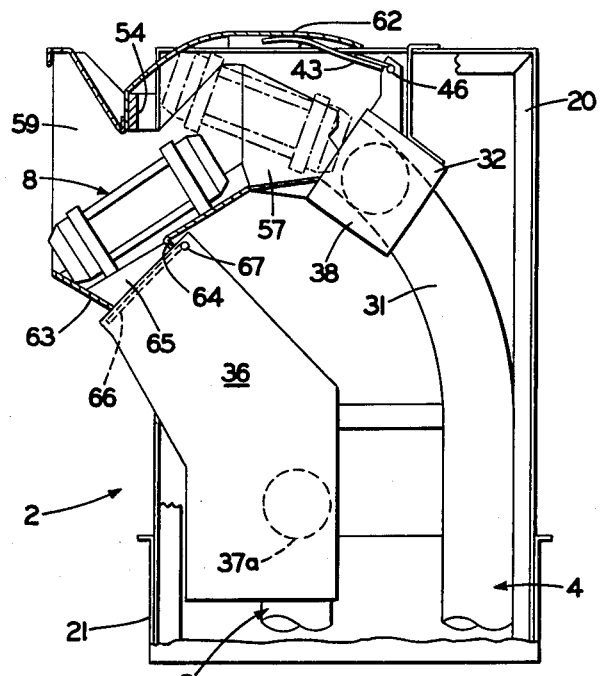
FIG. 25 is a diagrammatic view similar to FIG. 5 illustrating the arrival of a carrier at the customer arrival station in dot-dash lines, and showing the carrier dropped to a retained position in full lines.

Carrier 8 propelled through and out of tube section 31 strikes flap valves 43 and 47 as it moves out of the tube and then strikes a carrier arrester 54, as shown by the dot-dash position of the carrier 8 in FIG. 25. Carrier arrester 54 is a "sling-shot" type of device (FIGS. 35 and 36), being mounted by brackets 55 and 56 on inner frame members 20, with the midsection of sling arrester 54 located in the line of carrier travel as the carrier is ejected from tube 4.

Carrier arrester 54 is made of a flexible, somewhat resilient material, and may be formed of a urethane rubber-like material, or of canvas, or of fabric material impregnated with rubber, or of plastic; and is shock-resistant when struck by a carrier, and is capable of absorbing energy to stop the carrier with minimum carrier bounce-back.

Guide chute means, generally U-shaped in cross section, and open at the top are formed by side plates 57, having slip joint connection 58 with other side plates 59, which have inturned trough flanges 60, and a connected bottom plate 61 which has an angular contour, well shown in FIG. 29. The members 57-58-59-60 and 61 are mounted on the inner open frame structure 20.

The upper end of the guide chute means adjacent the flap valves 43-47, and rearwardly of carrier arrester 54 may be termed an arrival chamber where the carrier 8 arrives upon discharge from tube 4. The arrival chamber forms part of the customer terminal arrival station means which also includes, among other components, the final tube section 31, the valve housing 32, the flap valve means 43-47, and the blower control switch 52. The top of the arrival chamber may be closed by a shroud 62. The lower end of the guide chute means or trough is provided with a cross member 63, (FIGS. 5, 6, 7 and 37) spanning between trough flanges 60. Member 63 and trough flanges 60 form a trough-like carrier-retaining receptacle which retains a carrier 8 that slides down the trough from the arrival chamber.

A generally rectangular opening is formed in the guide trough adjacent the cross member 63, located between the member 63 and the lower end 64 of bottom plate 61, and between the spaced lower flange 65 connected with the trough flanges 60 of side plates 59, all as best shown in FIG. 29. The rectangular opening is located immediately above the upper end of dispatch hopper 36.

Figure 26:
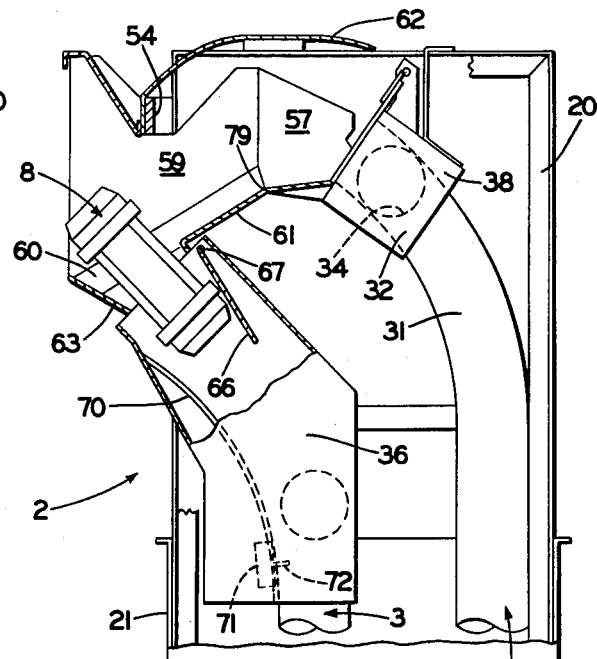
FIG. 26 is a view similar to FIG. 25 showing a carrier being inserted through the valve of the customer terminal send station.

Hopper 36 is box-like in formation, and its upper end is closed by a door 66 pivoted at 67 to the hopper walls. The pivot 67 for the hopper door 66 has a counterweight 68 (FIG. 9). The hopper door 66 upon opening enters inwardly of the upper end of hopper 36, as shown in FIGS. 8 and 26 and may be readily opened by pushing a carrier 8 against the door, as illustrated in FIG. 26. The door 66 when closed by the counterweight seals against gasket 69 (FIGS. 9 and 10).

Hopper 36 has a centrally located guide rod 70 mounted therein to direct a carrier 8 (FIG. 26) dropped into the dispatch chamber formed by the hopper, into the upper open end of tube 3, which tube end is the send tube for the customer terminal 2 (FIGS. 25, 26, 29 and 32). A blower control switch 71 is mounted within hopper 36 having a contact actuating finger 72 extending into the path of travel of a carrier 8 being dispatched (FIG. 5) for purposes set forth below. This switch 71 may be of the type shown in U.S. Pat. No. 3,867,593.

Figure 12:
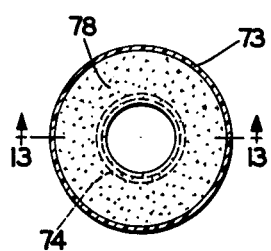
FIG. 12 is a sectional view taken on the line 12—12, FIG. 7.
Figure 13:
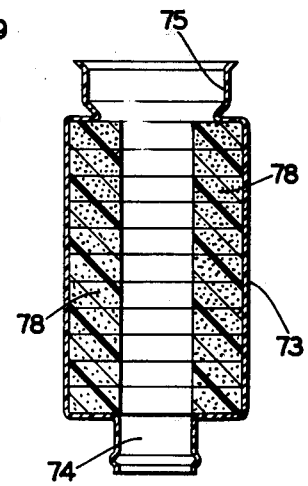
FIG. 13 is a sectional view of one of the customer terminal mufflers shown in FIG. 7 taken on the line 13—13, FIG. 12.

The mufflers 14 and 16 are connected, respectively, between the dispatch hopper 36 and valve housing 32 (FIGS. 5, 6, 7, 12, 13, 15 and 16) and the blower 10. The function of these mufflers is to substantially and effectively reduce the noise emanating from the pneumatic tube during travel of a carrier therethrough, which noise apparently is carried along in the moving airstream. Mufflers 14 and 16 have the same construction; and one of them, say muffler 14, is shown in FIGS. 12 and 13 and includes a tubular molded plastic barrel 73 having reduced neck tube connector ends 74 and 75. Connector 74 of muffler 14 is adapted to be connected with blower outlet 15 at 76; and connector 75 is adapted to be connected at 77 with tubular connectors 37a extending from dispatch hopper 36 (FIG. 7). Similarly, muffler 16 is connected with valve housing 32 and blower intake 12.

The muffler barrel 73 is filled with a sound muffling, sound absorbing, or sound deadening foam material, preferably fire-resistant urethane foam which may be inserted within the barrel 73 as a series of foam rings 78, as shown in FIG. 13. The rings 73 have aligned inner openings of substantially the same diameter as the inner diameter of the tube connector 74 and the various tubes 3 and 4 of the tube system so as not to retard pneumatic system air flow through the mufflers as they perform their sound-absorbing functions.

The mufflers 14 and 16 located adjacent the blower in the customer terminal 2 thus effectively suppress the sound of noise of air flow produced by the blower. The noise of blower operation itself also is at a remote place confined in the customer terminal, and thus does not create excessive noise at the bank teller's station where blowers for pneumatic tube banking systems normally have been installed in prior devices.

Furthermore, the location of the blower for each system at the customer terminal 2, rather than at the location of the teller terminal or in the teller terminal, reduces the size of and space requirements for teller terminals 1. This results in permitting a number of teller terminals 1 to be located side by side with minimum space requirements at a teller station served by a single teller. This is an important benefit because the teller station requires considerable space for many other components used by a teller in conducting various banking operations.

The blower outlet 15, as stated, is connected with the dispatch hopper 36 of the customer terminal 2 and thus supplies air under pressure to the interior of the hopper and to the air tube 3 connected therewith as a send tube for the customer terminal 2, to blow a carrier 8 from the customer terminal 2 to a teller terminal 1. This air pressure assists in maintaining the hopper door 66 closed when the blower is operating.

However, as described below, the blower does not operate until a carrier 8 has been inserted into the dispatch hopper 36. Accordingly, there is little resistance to opening the door 66 by pushing an end of a carrier 8 against the door, as shown in FIG. 26. The only resistant is the effect of the counterweight 68 which closes the door as soon as the carrier 8 is disengaged from the door 66 by falling further by gravity into the hopper. Subsequent contact of the dropping carrier 8 with the trigger finger 72 of switch 71 activates the blower 10, as later described, and air under pressure in the dispatch hopper 36 when the blower is operating assists counterweight 68 in closing the door 66 and maintaining it closed and sealed against the escape of air from the hopper 36 and the system generally.

The construction and operation of components of the new customer terminal and coordination thereof with other components of the system have a number of important facets resulting from the concepts of the invention.

As stated, the valve housing 32 and its chamber are under vacuum conditions when the blower 10 is operating due to connection of the valve housing through the muffler 16 with the blower intake 12. The seal of the flap valves 43–47 not only provides for maintaining the vacuum in the chamber of valve housing 32, but the flap valves 43–47 are maintained sealed and closed by the vacuum during travel of a carrier 8 approaching the valve housing 32, by vacuum through tube 4, until a carrier 8 forces the flap valves 43–47 open and enters the arrival chamber.

At the time when carrier 8 opens the flap valves 43–47, which in effect constitute door means for the tubular end section 31, the flap hinge strip 50 disengages switch actuator 53 (FIG. 14a) which deactivates the blower 10.

The carrier 7 thus ejected strikes the carrier arrester 54; but meanwhile, the main flap valve 43 is opened by carrier impact to the position indicated at 49 in FIG. 14 and so held until the carrier entirely clears flap 43. We have discovered that the bounce-back of the carrier 8 from an arrester 54 under such conditions normally at times may drive the carrier to reenter the tube section 31. To avoid such event, the secondary flap valve 47 has been provided and functions positively to prevent such malfunction. Flap 47 also is moved by the carrier to the full line position of FIG. 14a. However, the carrier quickly clears the lower or outer edge of secondary flap valve 47, and the flap drops back to its normal full line position of FIG. 14 and blocks the bouncing back carrier from reentering the tube section 31.

Instead, the carrier may bounce off of secondary flap valve 47 and drop onto the trough bottom plate 61 where a portion of a carrier 8 between its ends and located to the right of the center of gravity of the carrier, viewing FIG. 29, may strike the angular corner 79 of guide chute bottom plate 61 to tilt the carrier counterclockwise so that it drops down the chute until it engages retainer cross member 63 in the position shown in full lines in FIG. 25.

Another important function of the new concept of the improved customer terminal 2 is the control of blower operation of the blower located at the customer terminal 2 by the arrival of a carrier 2 or dispatch of a carrier from the customer terminal. The same control of the blower operation by the arrival and dispatch of a carrier takes place at the improved teller terminal as described below.

In this manner, blower operation is controlled by and the blower only operates when a carrier is in the air tube system and being conveyed from one to the other of the terminals. This contrasts with and eliminates the problems existing in prior devices wherein blower operation was controlled not by the carrier but by a timer which for all operations had a "blower-on" condition of a time interval long enough to permit transmission of the most heavily loaded carrier at a slower than normal average speed.

The new concept thus eliminates the requirement of and use of a timer, and only uses power for blower operation when a carrier actually is being transmitted and moving in the system.

Also, another facet of the new concept involves the counterweighted door 66 at the customer terminal dispatch hopper 36 from which hopper the carrier is conveyed by air pressure. In prior constructions, the door for such a hopper has been spring biased, and the spring control required considerable effort to overcome the force of the spring by a customer attempting to deposit a carrier in the dispatch hopper.

Furthermore, the particular construction and operation of the customer terminal receive station valve housing, and dispatch hopper send station, and their described connections through mufflers with a blower located in the customer terminal 2, as well as the arrangement of the carrier retainer means upon carrier arrival at the customer terminal, avoids complex structural arrangements, special holding devices and release devices present in prior pneumatic tube banking systems.

II. Teller Station

One or more teller terminals 1 are located at the teller station, as indicated in FIGS. 41 and 42. Each teller terminal 1 (FIG. 17) consists of an enclosure 80 containing internal tubing with flanges for connection to the pneumatic tubes 3 and 4 by pneumatic tube couplings 18; a cavity 81 to receive an arriving carrier, an opening 82 closed by a door for sending a carrier, and control devices, as well as components of arrival station means and dispatch station means similar to the customer terminal arrival station means and dispatch station means.

A carrier 8 sent from the customer terminal 2 through pneumatic tube 3 enters the rear of terminal 1 through a vertical section of tube 3, through muffler 17 and through a tube section 83, which has a bend to discharge the carrier somewhat horizontally to an arrival chamber where the carrier is stopped by a usual shock absorber cushion 84 which cushions the impact of the carrier. A switch 85 having a trigger projecting in the tube section 83 is actuated by the arriving carrier to cut off blower operation.

Figure 22:
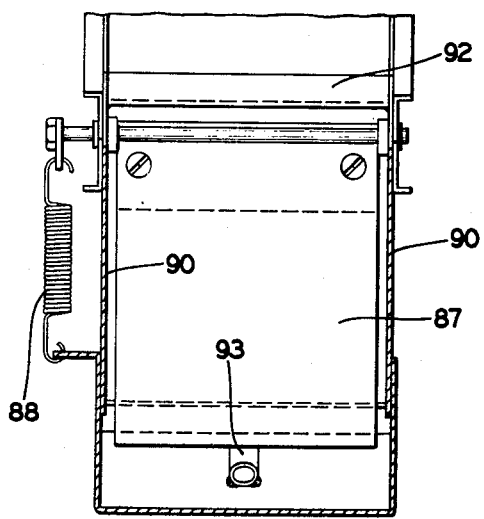
FIG. 22 is a sectional view looking in the direction of the arrows 22—22, FIG. 17, showing the valve controlled send station of the teller terminal.
Figure 20:
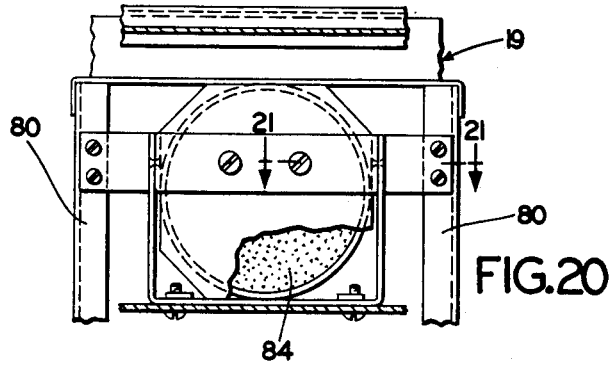
FIG. 20 is a sectional view taken on the line 20—20, FIG. 17, illustrating the carrier arrester at the arrival station of the teller terminal.
Figure 23:
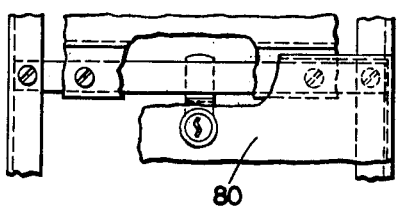
FIG. 23 is a fragmentary view, with parts broken away, looking in the direction of the arrows 23—23, FIG. 17.

The carrier on arrival at the teller terminal 1 after striking the shock absorber 84 drops to the carrier retaining cavity 81 which is formed by chute-like walls 86 where it is held. The teller removes the carrier for carrying out the banking operation and then deposits the carrier approximately vertically through the send opening 82, which depresses hinged door 87 closed by spring 88 (FIG. 22) and the carrier enters into dispatch station generally indicated at 89 formed by plates 90, 91 and 92 and a centrally located curved guide rod 93 which directs the carrier into the upper end of tube 4 which acts as a send tube for the teller terminal 1.

As a carrier passes through the teller terminal dispatch station 89, it actuates a switch 94 which in turn activates blower 10. Operation of blower 10 established vacuum conditions at the open end of tube 4 at teller terminal 1 which pulls the carrier that drops into the tube from the teller terminal to the customer terminal 2.

As stated, a carrier 8 as blown through tube 3 from customer terminal 2, passes through teller muffler 17 (FIGS. 17 and 24). Muffler 17 comprises a perforated tubular section 95 surrounded by polyester polyurethane foam 96, similar to the urethane foam in mufflers 14 and 16. A plastic sheet material sleeve, preferably formed of two pieces 97, stapled together at 98, surrounds the plastic material 96 to retain it in place and to provide an exterior muffler seal preventing the escape of air from the muffler.

The muffler 17 performs a function at the teller terminal similar to the mufflers 14 and 16 in reducing the noise level of air currents passing through the system. The difference between the muffler 17 and mufflers 14 and 16 is that the carrier actually passes through the muffler 17.

The presence of the muffler 17 thus reduces the noise level heretofore present at teller terminals used in prior pneumatic tube banking systems. Furthermore, because of the elimination of everything but tubing, and the arrival and dispatch stations at the teller terminal 1, it has a minimum size and may be very slender in width as illustrated in FIGS. 41 and 42.

The teller terminal switches (FIG. 17) 85 and 94 perform the same function as performed by similar switches at the customer terminal 2, namely, enabling control of the blower by carrier movement and position. In other words, at the teller terminal 1, blower operation is determined or activated or deactivated by the dispatch of a carrier from the terminal or by its arrival at the terminal.

The new construction of terminals 1 and 2 and their two-tube connection in the system shown and described provides maximum convenience to both the customer and the teller in that the location of the retainer station in customer terminal 2 and of the carrier-receiving cavity in teller terminal 1 into which a carrier 8 is delivered in each instance from above, is such that the delivered carrier is readily accessible for being handled by a customer or teller.

Furthermore, the send opening at each terminal is entered in each instance through a valve-controlled opening accessible from the same zone as the retainer means or receive cavity, for substantially vertical deposit of the carrier to dispatch it from one terminal to the other.

III. Pneumatic Tubes

The arrangement of the pneumatic tubes 3 and 4 connecting teller stations 1 and remote customer stations 2 has been described generally in connection with FIGS. 38 and 39. One important feature is shown diagrammatically and relates to the manner of connection of tubes 4 with each customer terminal shown for example in FIG. 38. As diagrammatically illustrated, there is a double bend 99 in tubes 4 which provide crossovers of adjacent portions of tubes 3 so that the arriving portions of tubes 4 at the customer terminals 2 are located at the backs of such terminals. In this manner, the carriers arrive at the tops of the terminals with any customer in any auto 6 using a terminal 2 able to face a teller located in the bank building looking through a window 5 toward the customer for visual communication.

This simple tube crossover solves problems that have been encountered in pneumatic tube banking installations in the past where large sweeping tube bends and tube rerouting has been necessary for installations of non-captive systems such as shown in U.S. Pat. No. 3,828,698.

In the units shown in the patent, the carrier has to be routed to arrive laterally rather than vertically of the terminal in order that it can be dealt outwardly to a customer in an adjacent auto. The elimination of these prior problems of system installation by the simple crossover expedient is important.

Furthermore, a minimum number of curved tube sections is required for installations such as illustrated in FIGS. 38 and 39, and the size of such sections as well as the length of straight sections can be determined before shipment to the place of installation such that normally only straight sections have to be cut on installing the system at the installation site. This substantially reduces shipping problems and simplifies fabrication at a manufacturing plant of components of the tube system.

IV. Carrier

Carriers 8 have been described and diagrammatically illustrated in the drawings. Such carriers may be carriers such as illustrated in U.S. Pat Nos. 3,787,008 and 3,788,577. Such carriers involve molded clear plastic bodies with rotatable covers at each end that may be easily opened for inserting or removing transaction material. Accelerator means provide a reasonably airtight seal in the pneumatic tube to obtain maximum efficiency of air pressure required for moving the carrier.

V. Cabinet Structure

The customer terminal 2 has been described as having a removable outer cabinet and an inner open frame structure 20 provided with a base 21. The outer cabinet structure includes side, back and top panels fabricated and joined in any convenient manner to form a box-like structure 100 which slips over the inner open framework structure 20 and which may be secured by bolts 23 to the inner frame flanges 22. Conveniently mounted on either the inner frame or cabinet 100 is a removable front panel 101 which may be locked in place at 102 to permit access to the components of the customer terminal 2 in a manner such as illustrated in FIG. 7 wherein the removable panel is shown by a fragmentary corner section thereof.

This removable panel provides for ease of access to the blower of other components for repair or adjustment. If additional access is required, the entire box-like cabinet 100 may be removed by loosening the bolt means 23 and raising the cabinet from the inner framework 20.

The cabinet construction has advantages in that the cabinet panels may be formed of any desired material or finish or color, separately from the basic components of the terminal, which reduces overall manufacturing costs and yet permits architectural requirements for outside appearance to satisfy desired banking institution decor.

The various panels may be linked with sound deadening material to further decrease the apparent noise level of system operation.

The cabinet for the teller terminals 1 may be similarly constructed. If desired, the side panels of the teller terminals 1 may be arranged to slide out to the front for access to the interior of the terminal units when required.

VI. Operation of System

In use, the improved system contemplates the presence of a carrier 8 at a customer terminal in the full line position of FIG. 25. The customer removes the carrier from the retention cavity and places a deposit or other banking media within the carrier and then drops the carrier into the dispatch hopper 36, as shown in FIG. 26, where it encounters and triggers switch finger 72 which is connected with the blower circuitry to activate the blower. Air pressure is introduced into the hopper 36 to drive the carrier from the customer terminal 2 to the arrive chamber of the teller terminal 1 in the position shown in dot-dash lines in FIG. 27.

Figure 27:
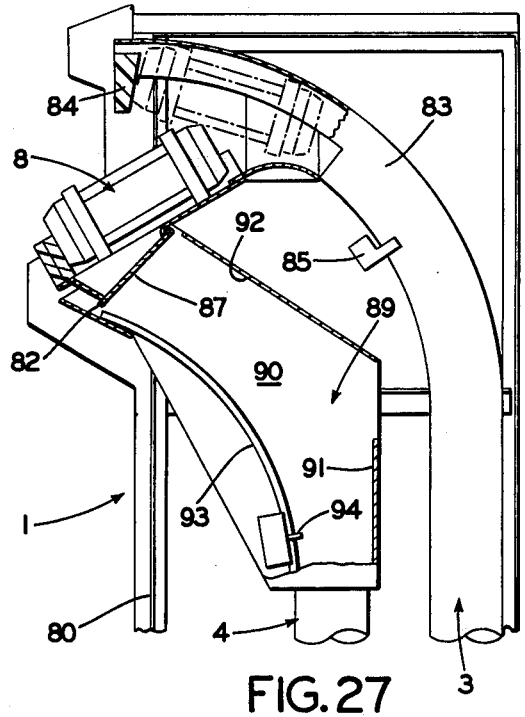
FIG. 27 is a diagrammatic view similar to FIG. 17 showing a carrier arriving at the teller terminal arrival station, in dot-dash lines, and dropped to a retained position in full lines.
Figure 28:
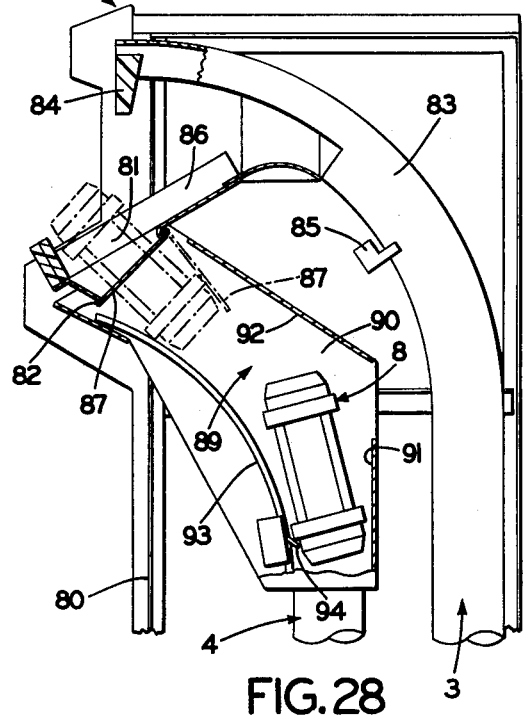
FIG. 28 is a view similar to FIG. 27 showing a carrier being inserted through the valve of the teller terminal send station in dot-dash lines, and dropped to a blower actuating position in full lines.

The carrier drops to the retention position of full lines in FIG. 27 where the teller processes the transaction and drops the carrier into the dispatch station, as indicated in FIG. 28. Meanwhile, on arrival at the teller terminal 1, the carrier triggers the switch 85 to deactivate the blower.

The blower again is activated as carrier 8 passes switch 94 at the bottom of the teller dispatch station, as shown in full lines in FIG. 28. Activation of the blower at this time establishes a condition of vacuum in the tube 4 at the teller terminal 1 which pulls the carrier back to the customer terminal 2 where its arrival actuates switch 52 to deactivate the blower. The customer may conveniently lift the carrier 8 from the retainer means at the customer terminal and after removing the contents of the carrier, if any, may return it to the full line position shown in FIG. 25, ready for a next banking transaction.

VII. In General

The improved construction of the components of the new pneumatic tube system and their interrelation and cooperative arrangement provide new, simply constructed, inexpensive, quiet and reliable systems for pneumatically transferring banking transactions between a customer and a teller with a customer located at a remote teller terminal in a position to see and be seen by a teller in a banking building looking through a window for visual communication.

The new structures are characterized by the advantages and overcome the deficiencies of prior structures described. Complex arrangement of components to provide delivery and dispatch means of a carrier from the terminals which have characterized prior devices have, and arrival chamber holding and release devices, all have been eliminated. Mechanism required for blower operation including timers in prior devices have been eliminated, and the blower operation is controlled by carrier arrival at or dispatch from a terminal.

Objectionable noise originating from the blower and from air currents traveling in the tube system have been substantially reduced and confined to the remote terminal which provides the further advantage of reduced size of teller terminals where blowers normally have been located in prior installations.

The control circuitry is greatly simplified since the power supply and activation and deactivation of the blower may be accomplished by simple known switch and switch control circuitry, free from timers and rectifiers, and minimizing the number of control relays required. This control circuitry may involve a low voltage system, and thus no separate conduits are required for interconnecting cables extending between the teller and customer terminals. Such cables are usual and known devices and are not shown in FIGS. 38 and 39.

Accordingly, the concepts of various aspects of the invention described in detail provide new pneumatic tube banking systems and improved structural components thereof cooperatively arranged and having a mode of operation which achieve the stated objectives, eliminate difficulties arising with prior devices, and solve problems and obtain the described new results.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the equipment is constructed and operated, and the advantageous, new and useful results obtained; and new and useful structures, devices, elements, arrangements, parts, combinations, systems, equipment, operations and relationships are set forth in the appended claims.

We claim:

1. A two-tube, non-captive carrier pneumatic tube banking system including a teller terminal and a remote customer terminal; first and second tubes forming a two-tube carrier conveyor systems connecting the terminals; blower means having inlet and outlet means mounted in the customer terminal supplying air to the two-tube system for pressure or vacuum movement of the carrier in tubes of the two-tube system; means connecting the first tube with the blower inlet means; the first tube acting as a carrier-receive tube for the customer terminal; means connecting the second tube with the blower output means; the second tube acting as a send tube for the customer terminal; the blower thereby supplying air under vacuum at the customer terminal to the first tube and air under pressure at the customer terminal to the second tube; muffler means mounted in line each with the means connecting the first and second tubes with the blower inlet and outlet means respectively to reduce noise emanating from air currents passing through the system; the first and second tubes having ends at the customer terminal; first blower control means for stopping blower means operation mounted adjacent the first tube customer terminal end; second blower control means for starting blower means operation mounted adjacent the second tube customer terminal end; said first blower control means being actuated by a carrier discharged from said first tube customer terminal end to stop blower means operation; said second blower control means being actuated by a carrier delivered to the second tube customer terminal end to start blower means operation; valve housing means mounted in the customer terminal surrounding the first tube customer terminal end; there being a carrier arrival opening formed in the valve housing; valve means pivotally mounted in the customer terminal normally closing said arrival opening; said first blower control means being mounted on the valve housing means; movement of the valve means when the valve means is engaged by a carrier discharged from said first tube customer terminal end actuating said first blower control means; means connecting the valve housing and the first tube customer terminal end with the muffler means that is connected with the blower inlet; the customer terminal arrival opening valve means including flexible flap means; the flexible flap means having a main flap member and a secondary flap member; the main flap member being pivotally mounted in the customer terminal; the secondary flap member being pivotally mounted on the valve housing; the flexible flap means members being moved by a carrier discharged from said first tube customer terminal end to open position and falling by gravity thereafter to closed position; and said valve means actuation of said first blower control means occurring during movement of the secondary flap member to open position when engaged by a carrier discharged from said first tube customer terminal end, thereby stopping blower means operation.

2. The construction defined in claim 1 in which the customer terminal is provided with carrier arrester means adjacent the carrier arrival opening; and in which the secondary flap member prevents a carrier from reentering the carrier arrival opening during carrier bounce-back from the carrier arrester means.

3. The construction defined in claim 2 in which stop means is provided in the valve housing means limiting opening move-member of the secondary flap member when engaged by carrier discharged from the first tube customer terminal end.

4. The construction defined in claim 3 in which guide chute means including carrier retainer means are mounted in the customer terminal; in which the guide chute means extends downward from the carrier arrival means to the retainer means; in which dispatch hopper means formed with a dispatch opening are mounted in the customer terminal below the retainer means; in which an opening is formed in the retainer means above the dispatch opening; in which a carrier bouncing back from the arrester means drops to said guide chute means and moves downward thereon to the retainer means; and in which the carrier holds the main flap member open until the carrier reaches said retainer means.

5. The construction defined in claim 4 in which the flexible means is held in sealing relation with the valve housing arrival opening by vacuum established in the valve housing means for air drawn from the valve housing means to the blower means inlet during blower operation.

6. A two-tube, non-captive carrier pneumatic tube banking system including a teller terminal and a remote customer terminal; first and second tubes forming a two-tube carrier conveyor system connecting the terminals; blower means having inlet and outlet means mounted in the customer terminal supplying air to the two-tube system for pressure or vacuum movement of the carrier in tubes of the two-tube system; means connecting the first tube with the blower inlet means; the first tube acting as a carrier-receive tube for the customer terminal; means connecting the second tube with the blower outlet means; the second tube acting as a send tube for the customer terminal; the blower thereby supplying air vacuum at the customer terminal to the first tube and air under pressure at the customer terminal to the second tube; first and second muffler means mounted in line respectively with the means connecting the first and second tubes with the blower inlet and outlet means to reduce noise emanating from air currents passing through the system; the first and second tubes having tube ends at the teller terminal; arrival station means having a discharge opening mounted in the teller terminal; third muffler means mounted in the teller terminal connecting the arrival station means with the second tube teller terminal end; dispatch station means mounted in the teller terminal; means connecting the dispatch station means with the first tube teller terminal end; the third muffler means includes an inner perforate tube section, foam air-current noise reducing means surrounding the inner perforate tube section, the plastic sleeve means surrounding and enclosing the foam means; and a carrier arriving at the teller terminal moving from the second tube teller terminal end through the third muffler means inner perforate tube section and then into the arrival station means connected with the third muffler means.

* * * * *

UNITED STATES PATENT AND TRADEMARK OFFICE
CERTIFICATE OF CORRECTION

PATENT NO. : 4,059,246
DATED : November 22, 1977
INVENTOR(S) : Walter G. Anders, et al.

It is certified that error appears in the above-identified patent and that said Letters Patent are hereby corrected as shown below:

Column 9, Line 2 - change "to" to -so-

Column 10, Line 32 - change "of" first occurrence to --or--

Column 12, Line 57 - change "established" -establishes-

Column 14, Line 51 - change "linked" to -lined-

Column 16, Line 20 - change "systems" to -system-

Column 16, Line 28 - change "output" to -outlet-

Column 17, Line 15 - change "move-member" to -movement-

Column 17, Line 32 - insert word -flap- between "flexible" and "means"

Column 17, Line 34 - change "for" to -from-

Column 18, Line 14 - insert word -under- after "air" and before "vacuum"

Signed and Sealed this

Fourteenth Day of March 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,059,246
DATED : November 22, 1977
INVENTOR(S) : Walter G. Anders, et al.

It is certified that error appears in the above—identified patent and that said Letters Patent are hereby corrected as shown below:

Column 17, Line 14 - change "in" to -on-

Column 18, Line 30 - change "the" (last occurrence) to -and-

Signed and Sealed this

Second Day of January 1979

[SEAL]

Attest:

RUTH C. MASON
Attesting Officer

DONALD W. BANNER
Commissioner of Patents and Trademarks